(12) United States Patent
Wu et al.

(10) Patent No.: US 11,558,832 B2
(45) Date of Patent: Jan. 17, 2023

(54) TIME AND FREQUENCY SYNCHRONIZATION METHOD, NETWORK DEVICE AND TERMINAL

(71) Applicant: VIVO MOBILE COMMUNICATION CO., LTD., Guangdong (CN)

(72) Inventors: Kai Wu, Guangdong (CN); Peng Sun, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/959,445

(22) PCT Filed: Jan. 2, 2019

(86) PCT No.: PCT/CN2019/070070
§ 371 (c)(1),
(2) Date: Jul. 1, 2020

(87) PCT Pub. No.: WO2019/134643
PCT Pub. Date: Jul. 11, 2019

(65) Prior Publication Data
US 2020/0374821 A1 Nov. 26, 2020

(30) Foreign Application Priority Data
Jan. 5, 2018 (CN) .......................... 201810012587.6

(51) Int. Cl.
*H04W 72/04* (2009.01)
*H04W 56/00* (2009.01)
(Continued)

(52) U.S. Cl.
CPC ....... *H04W 56/001* (2013.01); *H04J 13/0029* (2013.01); *H04J 13/0062* (2013.01);
(Continued)

(58) Field of Classification Search
CPC ... H04W 56/001; H04W 56/00; H04W 76/28; H04W 76/11; H04W 76/27;
(Continued)

(56) References Cited

U.S. PATENT DOCUMENTS

2014/0112229 A1 4/2014 Merlin et al.
2014/0198696 A1 7/2014 Li et al.
(Continued)

FOREIGN PATENT DOCUMENTS

CN 1968049 A 5/2007
CN 101083503 A 12/2007
(Continued)

OTHER PUBLICATIONS

NPL, QUALCOMM R1-1720417 "Efficient monitoring of DL control channels", Nov. 27-Dec. 1, 2017 (Year: 2017).*
(Continued)

*Primary Examiner* — Mahbubul Bar Chowdhury
(74) *Attorney, Agent, or Firm* — Brooks Kushman P.C.

(57) ABSTRACT

The present disclosure provides a time-and-frequency synchronization method, a network device, and a terminal. The time-and-frequency synchronization method for the terminal includes: subsequent to determining that the terminal in an idle state or a DRX state needs to be woken up to receive a downlink signal, receiving a physical signal for time-and-frequency synchronization from the network device; and performing time-and-frequency synchronization in accordance with the physical signal.

20 Claims, 7 Drawing Sheets

(51) Int. Cl.
*H04W 76/28* (2018.01)
*H04W 76/11* (2018.01)
*H04W 76/27* (2018.01)
*H04J 13/00* (2011.01)
*H04W 52/02* (2009.01)
*H04W 68/00* (2009.01)
*H04L 101/654* (2022.01)

(52) U.S. Cl.
CPC ... *H04W 52/0229* (2013.01); *H04W 52/0235* (2013.01); *H04W 68/005* (2013.01); *H04W 76/11* (2018.02); *H04W 76/27* (2018.02); *H04W 76/28* (2018.02); *H04L 2101/654* (2022.05)

(58) Field of Classification Search
CPC ......... H04W 52/0229; H04W 52/0235; H04W 52/02; H04W 52/0225; H04W 52/0212; H04W 68/005; H04J 13/0029; H04J 13/0062; H04L 61/6054; Y02D 30/70
See application file for complete search history.

(56) References Cited

U.S. PATENT DOCUMENTS

| | | | |
|---|---|---|---|
| 2016/0262100 | A1 | 9/2016 | Larsson et al. |
| 2016/0373237 | A1 | 12/2016 | Shellhammer et al. |
| 2017/0078998 | A1 | 3/2017 | Li |
| 2017/0171690 | A1* | 6/2017 | Kim .................. H04L 51/02 |
| 2017/0230935 | A1* | 8/2017 | Xu .................... H04W 8/24 |
| 2017/0279522 | A1 | 9/2017 | Yi |
| 2018/0332549 | A1* | 11/2018 | Bhattad ............. H04W 56/001 |
| 2020/0145921 | A1* | 5/2020 | Zhang ................ H04W 76/27 |
| 2020/0267670 | A1* | 8/2020 | strom ................. H04W 48/10 |
| 2020/0281042 | A1* | 9/2020 | Tie .................... H04W 68/025 |
| 2020/0367166 | A1* | 11/2020 | Wong ................. H04W 4/70 |
| 2021/0153163 | A1* | 5/2021 | Hwang ............... H04W 68/02 |

FOREIGN PATENT DOCUMENTS

| | | |
|---|---|---|
| CN | 101646231 A | 2/2010 |
| CN | 104737597 A | 6/2015 |
| CN | 105191432 A | 12/2015 |
| CN | 107181561 A | 9/2017 |
| EP | 3136792 A4 | 6/2017 |
| JP | 2017510149 A | 4/2017 |
| JP | 2018521574 A | 8/2018 |
| JP | 2020519196 A | 6/2020 |
| KR | 20160148007 A | 12/2016 |
| WO | 2008087813 A1 | 7/2008 |
| WO | 2016061786 A1 | 4/2016 |
| WO | 2016204933 A1 | 12/2016 |
| WO | 2018204799 A1 | 11/2018 |

OTHER PUBLICATIONS

Office Action dated Jan. 4, 2021 issued in Korean Application No. 10-2020-7018276.
Extended European Search Report dated Nov. 12, 2020 issued in PCT/CN2019/070070.
3GPP TSG RAN WG1 Meeting #90, R1-1713100, Prague, Czech Republic Aug. 21-25, 2017, "Discussion on wake up signal and wake up channel for NB-IoT", 13 pages.
3GPP TSG RAN WG1 Meeting #91, R1-1720417, Reno, USA, Nov. 27-Dec. 1, 2017, "Efficient monitoring of DL control channels", 11 pages.
3GPP TSG RAN WG2 Meeting #99bis, R2-1710641, Prague, Czech Republic, Oct. 9-13, 2017, "WUS consideration for efeMTC", 7 pages.
International Search Report and Written Opinion dated Jul. 16, 2020 issued in PCT/CN2019/070070.
First Office Action dated Mar. 19, 2020 issued in Chinese Application No. 201810012587.6.
Huawei, HiSilicon, On functions of power saving signal [online],3GPPTSG RAN WG1Meeting #91 R1-1719470, [Search Date Jul. 7, 2021], Internet ,2017.
Japanese Office Action, dated Aug. 6, 2021, issued in JP2020536772.
Sony, Wake up Signalling for efeMTC [online],3GPP TSG RAN WG1 Meeting #90 R1-1714576, [Search Date Jul. 7, 2021], Internet ,2017, p. 1-9, pp. 17.
Second Office Action for Japanese Application No. 2020-536772, dated Apr. 15, 2022, 3 Pages.

* cited by examiner subsequent to determining that a terminal in an idle state or a DRX state needs to be woken up to receive a downlink signal and prior to transmitting the downlink signal to the terminal, transmitting a physical signal for time-and-frequency synchronization to the terminal — 41

FIG. 4 subsequent to determining that a terminal in an idle state or a DRX state needs to be woken up to receive a downlink signal, receiving a physical signal for time-and-frequency synchronization from a network device — 51 performing time-and-frequency synchronization in accordance with the physical signal — 52

FIG. 5

TIME AND FREQUENCY SYNCHRONIZATION METHOD, NETWORK DEVICE AND TERMINAL

CROSS-REFERENCE TO RELATED APPLICATION

The present application is the U.S. national phase of PCT Application No. PCT/CN2019/070070 filed on Jan. 2, 2019, which claims priority of the Chinese patent application 201810012587.6 filed on Jan. 5, 2018, which are incorporated herein by reference in their entirety.

TECHNICAL FIELD

The present disclosure relates to the field of wireless communication technology, in particular to a time-and-frequency synchronization method, a network device and a terminal.

BACKGROUND

In a Long Term Evolution (LTE) or $5^{th}$-Generation (5G) communication system, a terminal in an idle state (RRC_IDLE) needs to detect a paging signal from a network device at preconfigured time. A procedure of the detection of the paging signal will be described as follows. A Physical Downlink Control Channel (PDCCH) corresponding to a Paging-Radio Network Temporary Identity (Paging-RNTI) of the paging signal is detected in a blind manner. When no PDCCH has been detected, a current detection procedure is ended. When there exists the PDCCH, a Physical Downlink Shared Channel (PDSCH) indicated by the PDCCH is further detected. When the detected PDSCH is not the paging signal for the terminal, the detection procedure is ended. In other words, the terminal in the idle state needs to detect the paging signal periodically, but a probability that the terminal receives the paging signal belonging to the terminal is relatively low. In addition, the power consumption for the detection of the PDCCH each time is relatively high, so it is adverse to the power saving of the terminal.

A basic mechanism of Discontinuous Reception (DRX) lies in configuring one DRX cycle for the terminal in a connected state (RRC_CONNECTED), and the DRX cycle consists of "On Duration" and "Opportunity for DRX". Within a time period of "On Duration", the terminal monitors and receives the PDCCH, and within a time period of "Opportunity for DRX", the terminal does not receive any downlink channel data so as to reduce the power consumption.

In order to further reduce the power consumption for the terminal in the idle state or the DRX state, such concepts as wake-up signal (WUS) and go-to-sleep (GTS) signal have been presented. When the terminal is in the idle state or the DRX state, prior to the blind detection of the paging signal or the PDCCH, the network device needs to transmit one WUS or go-to-sleep signal to the terminal. The terminal is woken up at corresponding time, and detects the WUS or the go-to-sleep signal. When the WUS has been detected by the terminal, the terminal detects the paging signal or the PDCCH in a blind manner; otherwise, the terminal does not detect the paging signal or the PDCCH in a blind manner (i.e., the terminal is maintained in a sleep state). When the go-to-sleep signal has been detected by the terminal, the terminal does not detect the paging signal or the PDCCH in a blind manner (i.e., the terminal is maintained in the sleep state); otherwise, the terminal detects the paging signal or the PDCCH in a blind manner (i.e., the terminal is woken up).

In order to receive the signal accurately, the terminal needs to maintain a time-and-frequency synchronization function on the basis of the received signal. When the terminal is in the idle state or the DRX state, it fails to receive any signal for a long time period. When the terminal starts to receive the signal next time, probably the accuracy of the time-and-frequency synchronization between the terminal and the network device is degraded, so the signal reception performance at reception time, including the reception performance of control channels and data channels as well as Radio Resource Management (RRM) measurement accuracy, may be adversely affected. In other words, there is an urgent need to ensure the time-and-frequency synchronization when the terminal in the idle state or the DRX state has been woken up, so as to ensure the reception performance of a downlink signal.

SUMMARY

In one aspect, the present disclosure provides in some embodiments a time-and-frequency synchronization method for a network device, including, subsequent to determining that a terminal in an idle state or a DRX state needs to be woken up to receive a downlink signal and prior to transmitting the downlink signal to the terminal, transmitting a physical signal for time-and-frequency synchronization to the terminal.

In another aspect, the present disclosure provides in some embodiments a time-and-frequency synchronization method for a terminal, including: subsequent to determining that the terminal in an idle state or a DRX state needs to be woken up to receive a downlink signal, receiving a physical signal for time-and-frequency synchronization from a network device; and performing time-and-frequency synchronization in accordance with the physical signal.

In yet another aspect, the present disclosure provides in some embodiments a network device, including a first transmission module configured to, subsequent to determining that a terminal in an idle state or a DRX state needs to be woken up to receive a downlink signal and prior to transmitting the downlink signal to the terminal, transmit a physical signal for time-and-frequency synchronization to the terminal.

In still yet another aspect, the present disclosure provides in some embodiments a terminal, including: a first reception module configured to, subsequent to determining that the terminal in an idle state or a DRX state needs to be woken up to receive a downlink signal, receive a physical signal for time-and-frequency synchronization from a network device; and a time-and-frequency synchronization module configured to perform time-and-frequency synchronization in accordance with the physical signal.

In still yet another aspect, the present disclosure provides in some embodiments a network device, including a processor, a memory, and a program stored in the memory and executed by the processor. The processor is configured to execute the program so as to implement the above-mentioned time-and-frequency synchronization method for the network device.

In still yet another aspect, the present disclosure provides in some embodiments a terminal, including a processor, a memory, and a program stored in the memory and executed by the processor. The processor is configured to execute the program so as to implement the above-mentioned time-and-frequency synchronization method for the terminal.

In still yet another aspect, the present disclosure provides in some embodiments a computer-readable storage medium storing therein a program. The program is executed by a processor so as to implement the above-mentioned time-and-frequency synchronization method for the network device.

In still yet another aspect, the present disclosure provides in some embodiments a computer-readable storage medium storing therein a program. The program is executed by a processor so as to implement the above-mentioned time-and-frequency synchronization method for the terminal.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 4 is a schematic view showing a time-and-frequency synchronization method for a network device according to some embodiments of the present disclosure;

FIG. 5 is a flow chart of a time-and-frequency synchronization method for a terminal according to some embodiments of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure. The expression "and/or" in the specification and the appended claims is used to represent at least one of listed objects.

When a terminal in an idle state or a DRX state has been woken up, it is necessary to ensure time-and-frequency synchronization, so as to ensure the reception performance of a downlink signal. An object of the present disclosure is to provide a time-and-frequency synchronization method, a network device and a terminal, so as to achieve the above purpose.

Figure 1:
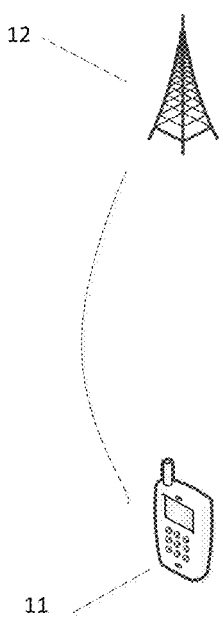
FIG. 1 is a schematic view showing an applicable network system according to some embodiments of the present disclosure.

FIG. 1 shows an applicable network system. As shown in FIG. 1, the network system includes a terminal 11 and a network device 12. The terminal 11 may be a User Equipment (UE), e.g., mobile phone, tablet personal computer, laptop computer, Personal Digital Assistant (PDA), Mobile Internet Device (MID), or wearable device. It should be appreciated that, a specific type of the terminal 11 will not be particularly defined herein. The network device 12 may be a base station in a 5G (or later) system (e.g., gNB, or 5G New Radio (NR) Node B (NB)), or a base station in any other communication system; it may also be called as Node B, evolved Node B, or any other name in the art. In other words, the base station may not be limited to a specific name, as long as a same technical effect is achieved. It should be appreciated that, in the embodiments of the present disclosure, the 5G base station is taken as an example, but a specific type of the network device 12 may not be limited thereto.

It should be appreciated that, a communication device in the embodiments of the present disclosure may be the terminal 11 or the network device 12, and functions of the communication device will be described hereinafter in conjunction with the embodiments.

The background involved in the embodiments of the present disclosure will be described hereinafter.

Figure 2:
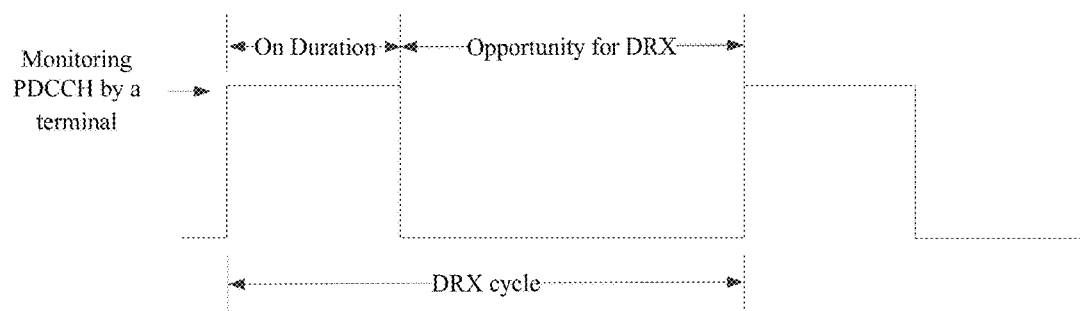
FIG. 2 is a sequence diagram of a DRX cycle.

FIG. 2 is a sequence diagram of a DRX cycle. As shown in FIG. 2, a basic mechanism of DRX lies in configuring one DRX cycle for the terminal in a connected state (RRC_CONNECTED), and the DRX cycle consists of "On Duration" and "Opportunity for DRX". Within a time period of "On Duration", the terminal monitors and receives a PDCCH, and within a time period of "Opportunity for DRX", the terminal does not receive any downlink channel data so as to reduce the power consumption. Here, drxStartOffset represents a start subframe for the DRX cycle, and longDRX-Cycle is used to indicate the quantity of subframes occupied by one long DRX cycle. The two parameters are both determined in accordance with a field longDRX-CycleStartOffset. In addition, onDurationTimer is used to indicate the quantity of consecutive subframes for the PDCCH to be monitored from the start subframe for the DRX cycle, i.e., the quantity of consecutive subframes within the time period of "On Duration".

Figure 3:
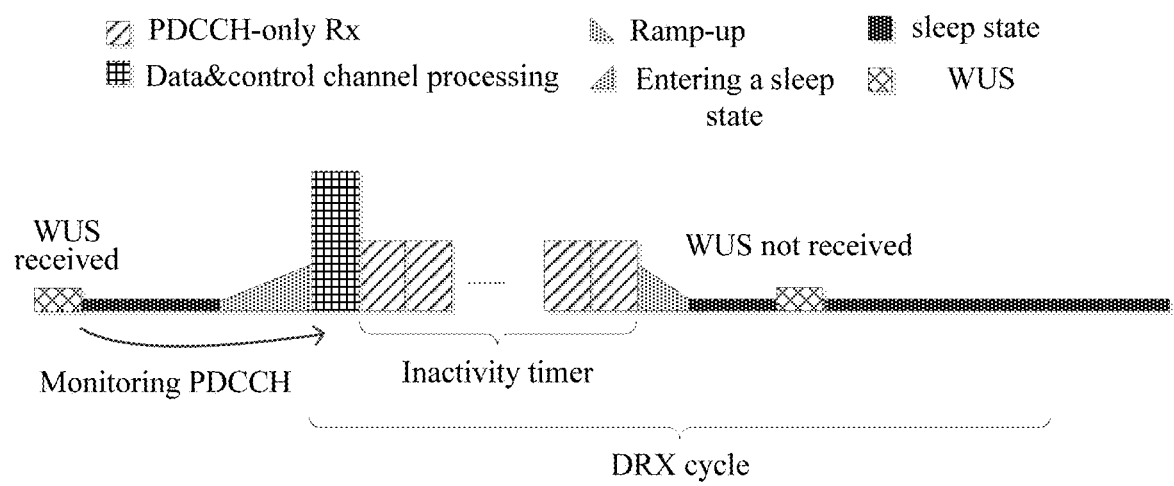
FIG. 3 is a schematic view showing a relationship between a time position for the transmission of a WUS and a time position for the transmission of the DRX cycle.

FIG. 3 shows a relationship between a time position for the transmission of a WUS and a time position for the transmission of the DRX cycle. As shown in FIG. 3, the network device may notify in advance, through the WUS, the terminal in the DRX state to monitor the PDCCH (monitor grant) and receive the PDCCH at next reception time. Upon the receipt of the WUS (i.e., WUS received in FIG. 3), the terminal may leave a sleep state and enter a procedure where power of a receiver ramps up to operating power (ramp-up). Then, the receiver may be started so as to receive data and control information (data&control channel processing) and the PDCCH (PDCCH-only Rx) at next reception time. After the reception of the PDCCH has been completed, the terminal may enter a procedure where the power of the receiver decreases from the operating power, and then the terminal may enter the sleep state. Within the DRX cycle, when the terminal fails to receive the WUS (i.e. WUS skipped), the terminal may continue to be in the sleep state.

In addition, when a go-to-sleep signal is transmitted by the network device to the terminal, the network device may notify in advance the terminal in the DRX state that the PDCCH does not need to be received at the next reception time. Upon the receipt of the go-to-sleep signal, the terminal may not receive the PDCCH at the next reception time. Through the transmission of the WUS or the go-to-sleep signal, it is able to prevent the UE from receiving a signal at each time where data is probably transmitted, thereby to reduce the power consumption for the terminal. In the embodiments of the present disclosure, the term "DRX" refers to a DRX mechanism in a connected state (Connected DRX, CDRX for short).

The present disclosure provides in some embodiments a time-and-frequency synchronization method for a network device which, as shown in FIG. 4, includes Step 41 of, subsequent to determining that a terminal in an idle state or a DRX state needs to be woken up to receive a downlink signal and prior to transmitting the downlink signal to the terminal, transmitting a physical signal for time-and-frequency synchronization to the terminal.

The physical signal may be a signal of a physical layer, and the downlink signal may be a Physical Downlink Control Channel (PDCCH) signal and/or a Physical Downlink Shared Channel (PDSCH) signal.

According to the embodiments of the present disclosure, subsequent to determining that the terminal in the idle state or the DRX state needs to be woken up to receive the downlink signal and prior to transmitting the downlink signal to the terminal, the physical signal for the time-and-frequency synchronization may be transmitted to the terminal, such that the terminal may perform the time-and-frequency synchronization in accordance with the physical signal before the reception of the downlink signal. As a result, it is able to improve the reception performance of the terminal in the idle state or the DRX state while reducing the power consumption for signaling processing.

In the embodiments of the present disclosure, the physical signal for the time-and-frequency synchronization is to be transmitted merely when the terminal needs to be woken up actually to receive the downlink signal, so the physical signal may be aperiodic.

In the embodiments of the present disclosure, the physical signal for the time-and-frequency synchronization may be a synchronization signal or a reference signal.

In a New Radio (NR) system or any other radio communication system, the physical signal may be an aperiodic Tracking Reference Signal (TRS), an aperiodic synchronization signal, or an aperiodic Channel State Information-Reference Signal (CSI-RS).

In the embodiments of the present disclosure, the fact that the terminal in the idle state or the DRX state needs to be woken up to receive the downlink signal may be determined as follows.

When a WUS for waking up the terminal to receive the downlink signal is transmitted to the terminal in the idle state or the DRX state, it may be determined that the terminal in the idle state or the DRX state needs to be woken up to receive the downlink signal; or when a go-to-sleep (GTS) signal for indicating the terminal to be maintained in a sleep state is not transmitted to the terminal in the idle state or the DRX state at predetermined time, it may be determined that the terminal in the idle state or the DRX state needs to be woken up to receive the downlink signal.

In the embodiments of the present disclosure, the network device may transmit the WUS to indicate that the terminal needs to be woken up to receive the downlink signal, or may not transmit the GTS signal to the terminal at the predetermined time to indicate that the terminal needs to be woken up to receive the downlink signal. Through the transmission of the WUS or the GTS signal, it is able to prevent the terminal from receiving a signal at each possible time where data is to be transmitted, thereby to reduce the power consumption of the terminal.

In the embodiments of the present disclosure, during the transmission of the WUS or GTS signal, the network device may transmit the WUS or GTS signal to each terminal individually, or transmit the WUS or GTS signal to all terminals belonging to a same UE group. A grouping mode of the UE group may be set according to the practical need, e.g., the terminals whose International Mobile Equipment Identities (IMEIs) have a same last digit may belong to a same group.

In the embodiments of the present disclosure, during the transmission of the physical signal for time-and-frequency synchronization, the network device may transmit the physical signal for time-and-frequency synchronization to each terminal individually, or transmit the physical signal for time-and-frequency synchronization to all terminals belonging to a same UE group. Identically, a grouping mode of the UE group may be set according to the practical need, e.g., the terminals whose IMEIs have a same last digit may belong to a same group.

In a possible embodiment of the present disclosure, the grouping mode of the UE group used by the network device to transmit the WUS/GTS signal may be the same as the grouping mode of the UE group used by the network device to transmit the physical signal for time-and-frequency synchronization.

In the embodiments of the present disclosure, the network device may use Downlink Control Information (DCI) to carry the WUS or the GTS signal.

In the embodiments of the present disclosure, prior to transmitting the downlink signal to the terminal, the network device may transmit the physical signal for time-and-frequency synchronization to the terminal repeatedly (using a plurality of resources), so as to ensure that the terminal is capable of receiving the physical signal. The quantity of transmission times may be predefined in a protocol, or configured by the network device.

In the embodiments of the present disclosure, the physical signal for time-and-frequency synchronization may consist of a sequence, and prior to transmitting the physical signal for time-and-frequency synchronization to the terminal, the time-and-frequency synchronization method may further include generating the sequence of the physical signal.

In the embodiments of the present disclosure, the sequence of the physical signal may be one of a Gold sequence, an m sequence, a Zadoff-chu (ZC) sequence, or a Computer Generated Sequence (CGS).

In the embodiments of the present disclosure, the generating the sequence of the physical signal may include generating the sequence of the physical signal in accordance with at least one of a cell Identity (ID), a terminal ID and a group ID of a UE group to which the terminal belongs. During the transmission of the physical signal, the network device may transmit the physical signal to all terminals belonging to a same UE group. In other words, a sequence generation parameter of the physical signal may be calculated in accordance with at least one of the cell ID, the terminal ID and the group ID of the UE group to which the terminal belongs.

In the embodiments of the present disclosure, the terminal ID may be determined in accordance with at least one of an International Mobile Subscriber Identity (IMSI) and an IMEI of the terminal; and/or the group ID of the UE group to which the terminal belongs may be determined in accordance with at least one of the IMSI and the IMEI of the terminal in the UE group.

In the embodiments of the present disclosure, the time-and-frequency synchronization method may further include transmitting an ID for determining the sequence of the physical signal to the terminal, such that the terminal may determine the sequence of the physical signal in accordance with the ID configured by the network device. The ID for determining the sequence of the physical signal may be at least one of a cell ID, a terminal ID and a group ID of a UE group to which the terminal belongs, or any other ID(s).

In the embodiments of the present disclosure, the transmitting, by the network device, the physical signal for time-and-frequency synchronization to the terminal may include determining configuration information about the physical signal, and transmitting the physical signal to the terminal in accordance with the configuration information. The configuration information about the physical signal may include at least one of a time-frequency resource position occupied by the physical signal for transmission, a bandwidth occupied by the physical signal for transmission, a density of the physical signal for transmission, a mapping pattern of the physical signal, and the quantity of retransmission times of the physical signal.

The configuration information may be predefined in a protocol or configured by the network device, or a part of the configuration information may be predefined in a protocol and a part of the configuration information may be configured by the network device.

In the embodiments of the present disclosure, when the configuration information is configured by the network device or a part of the configuration information is configured by the network device, the time-and-frequency synchronization method may further include transmitting the configuration information about the physical signal to the terminal, such that the terminal may accurately receive the physical signal in accordance with the configuration information.

In the embodiments of the present disclosure, when the configuration information is configured by the network device or a part of the configuration information is configured by the network device, the transmitting the configuration information about the physical signal to the terminal may include transmitting the configuration information about the physical signal to the terminal through a Radio Resource Control (RRC) message, or transmitting the configuration information about the physical signal to the terminal through the WUS.

In the embodiments of the present disclosure, when the configuration information is predefined in a protocol or a part of the configuration information is predefined in a protocol, the determining the configuration information about the physical signal may include acquiring the predefined configuration information about the physical signal.

In the embodiments of the present disclosure, the configuration information about the physical signal may include a time-frequency resource position occupied by the physical signal for transmission, and the time-frequency resource position may include at least one of a time-frequency resource position occupied by the physical signal within an occupied radio frame and a time-frequency resource position occupied by the physical signal within an occupied slot or occupied slots.

The time-frequency resource position occupied by the physical signal within the occupied radio frame may include at least one of radio frame number, subframe number, slot or symbol(s).

When the time-frequency resource position includes the time-frequency resource position occupied by the physical signal within the occupied radio frame, the time-frequency resource position occupied by the physical signal within the occupied radio frame may be determined as follows.

(1) The time-frequency resource position occupied by the physical signal within the occupied radio frame may be determined in accordance with transmission time of the WUS and a time offset T1, where $0 \leq T1 \leq T0$, and T0 represents a time interval between a start time position of the WUS and a start time position of a Paging Opportunity (PO)/DRX On Duration.

(2) Alternatively, the time-frequency resource position occupied by the physical signal within the occupied radio frame may be determined in accordance with the start time position of the PO/DRX On Duration and a time offset T2, where $0 \leq T2 \leq T0$, and T0 represents a time interval between a start time position of the WUS and the start time position of the PO/DRX On Duration.

(3) Alternatively, the time-frequency resource position occupied by the physical signal within the occupied radio frame may be determined in accordance with at least one of the cell ID, the terminal ID and the group ID of the UE group to which the terminal belongs. For example, a subframe number for the transmission of the physical signal for time-and-frequency synchronization may be a $[\text{mod}(\text{UE group ID}, X)]^{th}$ subframe, where X is a positive integer, and mod represents a modulo operation.

In (1), in a possible embodiment of the present disclosure, the time-frequency resource position occupied by the physical signal within the occupied radio frame may be a sum of transmission time of the WUS and T1.

T1 may be a value with millisecond or slot as a unit, and the value of T1 may be predefined in a protocol or configured by the network device. With respect to different terminals or UE groups, the values of T1 may be the same or different from each other. In a possible embodiment of the present disclosure, T1 may be associated with the terminal capability, and different processing capability levels may correspond to different values of T1 or different sets of values of T1. For example, different types of terminals may support different minimum values of T1. When T1 is configured by the network device, prior to determining the configuration information about the physical signal, the time-and-frequency synchronization method may further include receiving a processing capability level for DRX or paging reception reported by the terminal, and determining T1 in accordance with the processing capability level.

In (2), PO may be the paging opportunity. In a possible embodiment of the present disclosure, the time-frequency resource position occupied by the physical signal within the occupied radio frame may be a sum of the start time position of the PO/DRX On Duration and T1.

T2 may be a value with millisecond or slot as a unit, and the value of T2 may be predefined in a protocol or configured by the network device. With respect to different terminals or UE groups, the values of T2 may be the same or different from each other. In a possible embodiment of the present disclosure, T2 may be associated with the terminal capability, and different processing capability levels may correspond to different values of T2 or different sets of values of T2. For example, different types of terminals may support different minimum values of T2. When T2 is configured by the network device, prior to determining the configuration information about the physical signal, the time-and-frequency synchronization method may further include receiving a processing capability level for DRX or paging reception reported by the terminal, and determining T2 in accordance with the processing capability level.

In the embodiments of the present disclosure, when the configuration information about the physical signal includes the time-frequency resource position occupied by the physical signal within the occupied slot(s), the determining the configuration information about the physical signal may include determining the time-frequency resource position occupied by the physical signal within the occupied slot(s) in accordance with the cell ID, the terminal ID and the group ID of the UE group to which the terminal belongs.

In a possible embodiment of the present disclosure, the time-frequency resource positions occupied by the physical signal within the occupied time slot(s) may be distributed discretely, so as to facilitate the time-and-frequency synchronization and the RRM measurement.

In a possible embodiment of the present disclosure, the time-frequency resource positions occupied by the WUS within the occupied time slot(s) may be distributed continuously, so as to reduce an overhead, and facilitate the detection of the WUS at relatively low complexity.

As shown in FIG. 5, the present disclosure further provides in some embodiments a time-and-frequency synchronization method for a terminal which includes: Step 51 of subsequent to determining that the terminal in an idle state or a DRX state needs to be woken up to receive a downlink signal, receiving a physical signal for time-and-frequency synchronization from a network device; and Step 52 of performing time-and-frequency synchronization in accordance with the physical signal. The downlink signal may include a PDCCH signal and/or a PDSCH signal.

According to the embodiments of the present disclosure, subsequent to determining that the terminal in the idle state or the DRX state needs to be woken up to receive the downlink signal, the terminal may receive the physical signal for time-and-frequency synchronization from the network device, such that the terminal may perform the time-and-frequency synchronization in accordance with the physical signal prior to receiving the downlink signal. As a result, it is able to improve the reception performance of the terminal in the idle state or the DRX state while reducing the power consumption for signaling processing.

In the embodiments of the present disclosure, the physical signal for the time-and-frequency synchronization is to be transmitted merely when the terminal needs to be woken up actually to receive the downlink signal, so the physical signal may be aperiodic.

In the embodiments of the present disclosure, the physical signal for the time-and-frequency synchronization may be a synchronization signal or a reference signal.

In an NR system or any other radio communication system, the physical signal may be an aperiodic TRS, an aperiodic synchronization signal, or an aperiodic CSI-RS.

In the embodiments of the present disclosure, subsequent to performing, by the terminal, the time-and-frequency synchronization in accordance with the physical signal, the time-and-frequency synchronization method may further include receiving the downlink signal, and the downlink signal may include a PDCCH signal and/or a PDSCH signal.

Further, the receiving, by the terminal, the downlink signal may include: performing channel estimation in accordance with the physical signal and estimating a power delay profile and a frequency offset in accordance with the channel estimation; adjusting reception start time for next reception for the terminal in the idle state or the DRX state in accordance with the estimated power delay profile, and performing frequency offset compensation on a next received signal in accordance with the estimated frequency offset; and detecting a PDCCH and/or a PDSCH in accordance with the signal on which the frequency offset compensation has been performed.

In the embodiments of the present disclosure, the terminal may determine whether the terminal in the idle state or the DRX state needs to be woken up to receive the downlink signal as follows.

When a WUS for waking up the terminal to receive the downlink signal has been received from the network device, it may be determined that the terminal in the idle state or the DRX state needs to be woken up to receive the downlink signal; or when a GTS signal for indicating the terminal to be maintained in a sleep state has not been received at predetermined time, it may be determined that the terminal in the idle state or the DRX state needs to be woken up to receive the downlink signal.

In the embodiments of the present disclosure, the network device may transmit the WUS to indicate that the terminal needs to be woken up to receive the downlink signal, or may not transmit the GTS signal to the terminal at the predetermined time to indicate that the terminal needs to be woken up to receive the downlink signal. Through the transmission of the WUS or the GTS signal, it is able to prevent the terminal from receiving a signal at each possible time where data is to be transmitted, thereby to reduce the power consumption of the terminal.

In the embodiments of the present disclosure, during the transmission of the WUS or GTS signal, the network device may transmit the WUS or GTS signal to each terminal individually, or transmit the WUS or GTS signal to all terminals belonging to a same UE group. A grouping mode of the UE group may be set according to the practical need, e.g., the terminals whose IMEIs have a same last digit may belong to a same group.

In the embodiments of the present disclosure, during the transmission of the physical signal for time-and-frequency synchronization, the network device may transmit the physical signal for time-and-frequency synchronization to each terminal individually, or transmit the physical signal for time-and-frequency synchronization to all terminals belonging to a same UE group. Identically, a grouping mode of the UE group may be set according to the practical need, e.g., the terminals whose IMEIs have a same last digit may belong to a same group.

In a possible embodiment of the present disclosure, the grouping mode of the UE group used by the network device to transmit the WUS/GTS signal may be the same as the grouping mode of the UE group used by the network device to transmit the physical signal for time-and-frequency synchronization.

In the embodiments of the present disclosure, the network device may use the DCI to carry the WUS or the GTS signal.

In the embodiments of the present disclosure, the physical signal for time-and-frequency synchronization may consist of a sequence, and prior to performing the time-and-frequency synchronization in accordance with the physical signal, the time-and-frequency synchronization method may further include determining the sequence of the received physical signal.

In the embodiments of the present disclosure, the sequence of the physical signal may be one of a Gold sequence, an m sequence, a ZC sequence or a CGS.

In the embodiments of the present disclosure, the determining the sequence of the physical signal may include: determining the sequence of the physical signal in accordance with at least one of a cell ID, a terminal ID and a group ID of a UE group to which the terminal belongs, the physical signal being transmitted by the network device to all terminals belonging to a same UE group simultaneously during the transmission of the physical signal; and determining the sequence of the physical signal in accordance with an ID configured by the network device.

In other words, a sequence generation parameter of the physical signal may be calculated in accordance with at least one of the cell ID, the terminal ID and the group ID of the UE group to which the terminal belongs, or calculated in accordance with the ID configured by the network device.

In the embodiments of the present disclosure, the terminal ID may be determined in accordance with at least one of an IMSI and an IMEI of the terminal, or the group ID of the UE group to which the terminal belongs may be determined in accordance with at least one of an IMSI and an IMEI of the terminal belonging to the UE group.

In the embodiments of the present disclosure, the receiving, by the terminal, the physical signal from the network device may include acquiring configuration information about the physical signal, and receiving the physical signal from the network device in accordance with the configuration information.

The configuration information may be predefined in a protocol or configured by the network device, or a part of the configuration information may be predefined in a protocol and a part of the configuration information may be configured by the network device.

In the embodiments of the present disclosure, when the configuration information is predefined in a protocol or a part of the configuration information is predefined in a protocol, the acquiring the configuration information about the physical signal may include acquiring the predefined configuration information about the physical signal.

In the embodiments of the present disclosure, when the configuration information is configured by the network device or a part of the configuration information is configured by the network device, the acquiring the configuration information about the physical signal may include receiving the configuration information about the physical signal transmitted by the network device, so that the terminal may accurately receive the physical signal in accordance with the configuration information.

Further, when the configuration information is configured by the network device or a part of the configuration information is configured by the network device, the receiving the configuration information about the physical signal transmitted by the network device may include receiving the configuration information about the physical signal transmitted by the network device through Radio Resource Control (RRC) signaling, or receiving the configuration information about the physical signal transmitted by the network device through the WUS.

The configuration information about the physical signal may include at least one of a time-frequency resource position occupied by the physical signal for transmission, a bandwidth occupied by the physical signal for transmission, a density of the physical signal for transmission, a mapping pattern of the physical signal, the quantity of retransmission times of the physical signal, and signal sequence configuration information.

The time-frequency resource position occupied by the physical signal within an occupied radio frame may include at least one of radio frame number, subframe number, slot or symbol(s).

When the time-frequency resource position includes the time-frequency resource position occupied by the physical signal within the occupied radio frame, the time-frequency resource position occupied by the physical signal within the occupied radio frame may be determined as follows.

(1) The time-frequency resource position occupied by the physical signal within the occupied radio frame may be determined in accordance with transmission time of the WUS and a time offset T1, where $0 \le T1 \le T0$, and T0 represents a time interval between a start time position of the WUS and a start time position of a PO/DRX On Duration.

(2) Alternatively, the time-frequency resource position occupied by the physical signal within the occupied radio frame may be determined in accordance with the start time position of the PO/DRX On Duration and a time offset T2, where $0 \le T2 \le T0$, and T0 represents a time interval between a start time position of the WUS and the start time position of the PO/DRX On Duration.

(3) Alternatively, the time-frequency resource position occupied by the physical signal within the occupied radio frame may be determined in accordance with at least one of the cell ID, the terminal ID and the group ID of the UE group to which the terminal belongs. For example, a subframe number for the transmission of the physical signal for time-and-frequency synchronization may be a [mod(UE group ID, X)]th subframe, where X is a positive integer, and mod represents a modulo operation.

In (1), in a possible embodiment of the present disclosure, the time-frequency resource position occupied by the physical signal within the occupied radio frame may be a sum of transmission time of the WUS and T1.

T1 may be a value with millisecond or slot as a unit, and the value of T1 may be predefined in a protocol or configured by the network device. With respect to different terminals or UE groups, the values of T1 may be the same or different from each other. In a possible embodiment of the present disclosure, T1 may be associated with the terminal capability, and different processing capability levels may correspond to different values of T1 or different sets of values of T1. For example, different types of terminals may support different minimum values of T1. When T1 is configured by the network device, in a possible embodiment of the present disclosure, prior to acquiring the configuration information about the physical signal, the time-and-frequency synchronization method may further include reporting a processing capability level for DRX or paging reception to the network device, and receiving T1, which is configured by the network device in accordance with the processing capability level. The network device may transmit T1 to the terminal through RRC signaling or DCI.

In (2), PO may be the paging opportunity. In a possible embodiment of the present disclosure, the time-frequency resource position occupied by the physical signal within the occupied radio frame may be a sum of the start time position of the PO/DRX On Duration and T1.

T2 may be a value with millisecond or slot as a unit, and the value of T2 may be predefined in a protocol or configured by the network device. With respect to different terminals or UE groups, the values of T2 may be the same or different from each other. In a possible embodiment of the present disclosure, T2 may be associated with the terminal capability, and different processing capability levels may correspond to different values of T2 or different sets of values of T2. For example, different types of terminals may support different minimum values of T2. When T2 is configured by the network device, prior to acquiring the configuration information about the physical signal, the time-and-frequency synchronization method may further include reporting processing capability level for DRX or paging reception to the network device, and acquiring T2 configured by the network device in accordance with the processing capability level. The network device may transmit T2 to the terminal through RRC signaling or DCI.

In the embodiments of the present disclosure, when the configuration information about the physical signal includes the time-frequency resource position occupied by the physical signal within the occupied slot(s), the acquiring the configuration information about the physical signal may include determining the time-frequency resource position occupied by the physical signal within the occupied slot(s) in accordance with the cell ID, the terminal ID and the group ID of the UE group to which the terminal belongs.

The time-frequency resource positions occupied by the physical signal within the occupied time slot(s) may be distributed discretely.

In the embodiments of the present disclosure, the terminal may further perform RRM management in accordance with the received physical signal for time-and-frequency synchronization. In other words, subsequent to receiving the physical signal from the network device, the time-and-frequency synchronization method may further include performing the RRM measurement in accordance with the physical signal. In a possible embodiment of the present disclosure, the terminal may combine the received physical signal for time-and-frequency synchronization with an existing RRM reference signal (e.g., a Synchronization Signal (SS) block or a CSI-RS), so as to improve the RRM performance.

In the embodiments of the present disclosure, the receiving, by the terminal, the physical signal from the network device may include receiving the WUS and the physical signal through a single receiver, or through different receivers.

When the terminal receives the WUS and the physical signal through different receivers, the WUS may be received through a narrowband receiver, and the physical signal may be received through a broadband receiver.

When the time-frequency resource position occupied by the physical signal within the occupied radio frame is determined by the terminal in accordance with transmission time of the WUS and the time offset T1 and different receivers are adopted, it may take a certain processing time to switch to another receiver. In this case, it is necessary to configure T1 with a larger value for the terminal. In a possible embodiment of the present disclosure, the value of T1 may be greater than zero, i.e., the WUS and the physical signal may be transmitted at different timings. When the single receiver is adopted, i.e., it is unnecessary to switch the receiver, T1 with a smaller value may be configured for the terminal.

The time-and-frequency synchronization method will be described hereinafter in more details in conjunction with specific application scenarios.

First Embodiment

Figure 6:
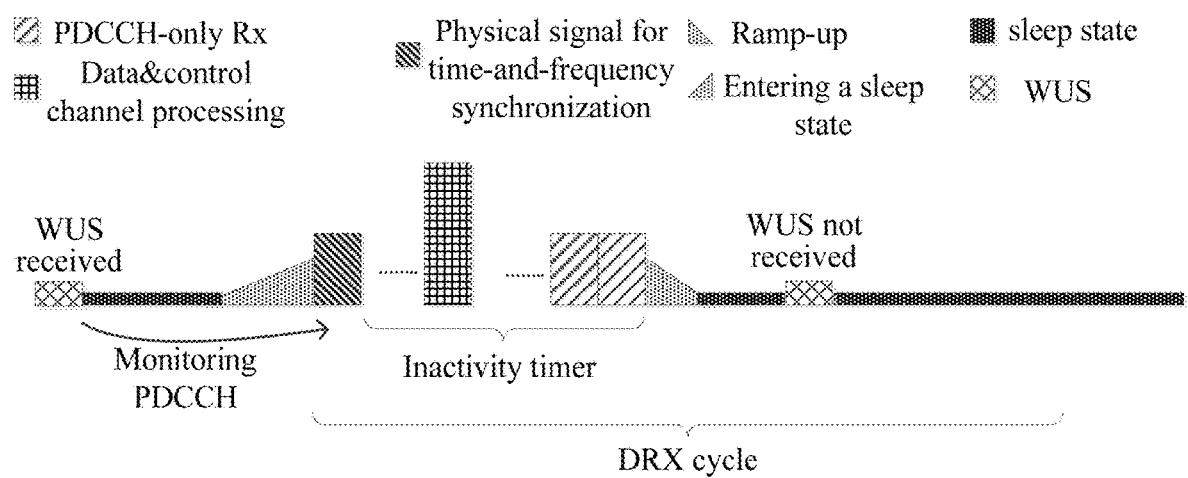
FIG. 6 is a schematic view showing a relationship between a time position for the transmission of a physical signal for time-and-frequency synchronization, and a time position for the transmission of the WUS as well as a time position for the transmission of a downlink signal according to a first embodiment of the present disclosure.

FIG. 6 shows a relationship between a time position for the transmission of the physical signal for time-and-frequency synchronization and a time position for the transmission of the WUS as well as a time position for the transmission of the downlink signal according to the first embodiment of the present disclosure.

As shown in FIG. 6, a transmission time of the physical signal for time-and-frequency synchronization (TRS in this embodiment) is not earlier than a transmission time of the WUS, and not later than an initial transmission time of the downlink signal.

In this embodiment, the time position for the transmission of the physical signal for time-and-frequency synchronization may be offset by T1 ms (or T1 slots) from the time position for the transmission of the WUS.

In this embodiment, the time position for the transmission of the physical signal for time-and-frequency synchronization may be offset by T2 ms (or T1 slots) from the start time position of the PO or the DRX On Duration.

In this embodiment, the time position for the transmission of the physical signal for time-and-frequency synchronization may be determined in accordance with at least one of the cell ID, the terminal ID and the group ID of the UE group to which the terminal belongs. For example, a subframe number for the transmission of the physical signal for time-and-frequency synchronization may be a [mod(UE group ID, X)]$^{th}$ subframe, where X is a positive integer, and mod represents a modulo operation.

In this embodiment, the configuration information about the physical signal for time-and-frequency synchronization may be configured by the network device through the RRC signaling, and the configuration information may include at least one of a radio frame number for the transmission of the physical signal, a subframe number, a specific time-frequency position, and an occupied bandwidth.

In this embodiment, when the WUS is transmitted in the form of a physical channel, e.g., PDCCH, the configuration information about the physical signal for time-and-frequency synchronization (the radio frame number for the transmission of the physical signal, the subframe number, the specific time-frequency position, the occupied bandwidth, and configuration information about the sequence) may be configured through the DCI. A field used by the information may be an existing field in a PDCCH format that has already been defined.

According to the first embodiment of the present disclosure, prior to transmitting the downlink signal to the terminal, the network device may transmit the physical signal for time-and-frequency synchronization repeatedly (using a plurality of resources), so as to ensure that the terminal is capable of receiving the physical signal. The quantity of retransmission times may be predefined in a protocol or configured by the network device.

Second Embodiment

The terminal may receive the WUS and the synchronization signal/PDCCH/PDSCH through a single receiver or different receivers.

When different receivers are adopted, it may take a certain processing time to switch to another receiver, and in this case, it is necessary to configure T1 with a larger value for the terminal.

When a single receiver is adopted, i.e., it is unnecessary to switch the receiver, T1 with a smaller value may be configured for the terminal.

For different terminals or UE groups, the values of T1 may be configured by the network device.

In a possible embodiment of the present disclosure, the terminal may report the processing capability level for the DRX or the paging reception to the network device. The network device may determine the value of T1 in accordance with the processing capability level, and configure the value of T1 for the terminal through the RRC signaling or the DCI. In a possible embodiment of the present disclosure, different processing capability levels may correspond to different values of T1 or different sets of values of T1.

Third Embodiment

In this embodiment, the physical signal for time-and-frequency synchronization may be distributed on number B of Physical Resource Blocks (PRBs) and occupy number X of slots (each slot may include number 14 of Orthogonal Frequency Division Multiplexing (OFDM) symbols). Within each slot, the physical signal may be distributed on number N of OFDM symbols, an interval between two adjacent OFDM symbols occupied by the physical signal may include number St of OFDM symbols, and there may exist number Sf of subcarriers for carrying the physical signal in every twelve (12) subcarriers in a frequency direction.

Figure 7:
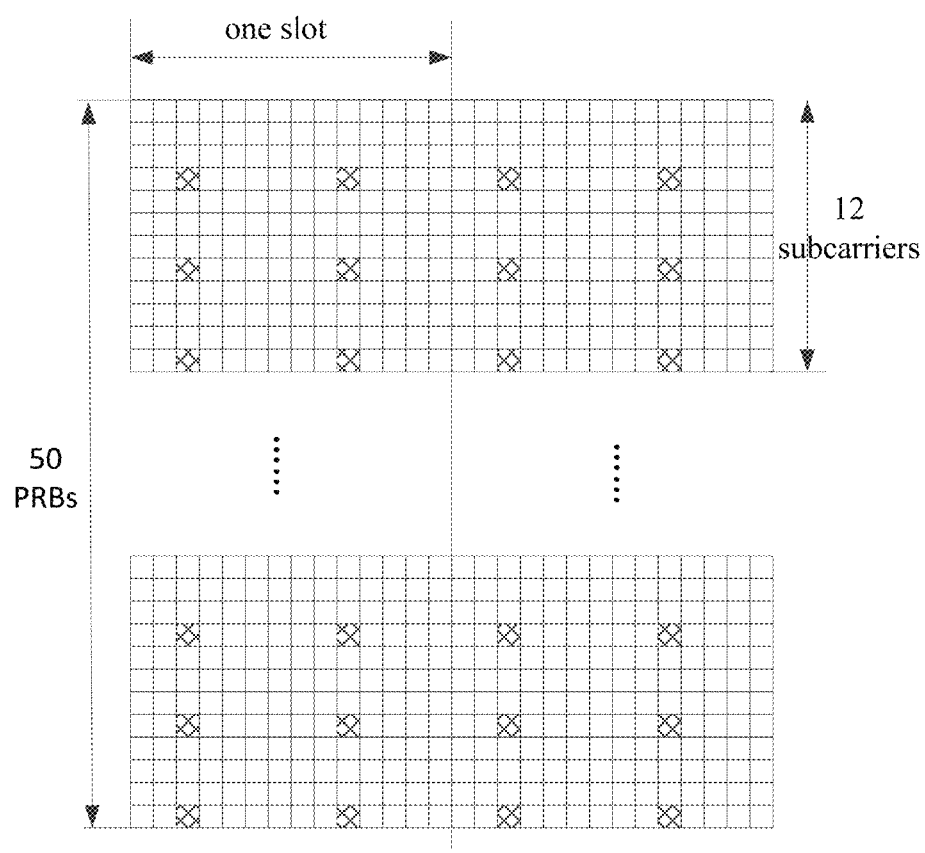
FIG. 7 is a schematic view showing positions of time-frequency resources occupied by the physical signal for time-and-frequency synchronization within an occupied slot according to a third embodiment of the present disclosure.

FIG. 7 is a schematic view showing the time-frequency resource positions occupied by the physical signal for time-and-frequency synchronization within the occupied slot according to the third embodiment of the present disclosure. As shown in FIG. 7, the physical signal for time-and-frequency synchronization (hatched boxes) is distributed on 50 PRBs, and occupies 2 slots (each slot may include 14 OFDM symbols). Within each slot, the physical signal is distributed on 2 OFDM symbols, an interval between two OFDM symbols occupied by the physical signal includes 7 OFDM symbols, and there exist 3 subcarriers for carrying the physical signal in every 12 subcarriers in the frequency direction.

Fourth Embodiment

In this embodiment, the sequence of the physical signal for time-and-frequency synchronization may be a Gold sequence, and the Gold sequence may be generated as follows.

One sequence may be initialized as follows. The Gold sequence may be an XOR of two m sequences, and a length of the outputted Gold sequence c(n) may be M, where n=0,1, . . . ,M−1:

$$c(n) = (x_1(n+N_c) + x_2(n+N_c)) \mod 2 \quad (1),$$

$$x_1(n+31) = (x_1(n+3) + x_1(n)) \mod 2 \quad (2)$$

and $$x_2(n+31) = (x_2(n+3) + x_2(n+2) + x_2(n+1) + x_2(n)) \mod 2 \quad (3).$$

$N_c = 1600$, an initial state of $x_1$ may be $x_1(0)=1$, $x_1(n)=0$, n=1,2, . . . ,30, and an initial state of $x_2$ may be $$c_{init} = (2^{10} \cdot (14n_{s,f}+l+1)(2n_{ID}+1)+n_{ID}) \mod 2^{31}.$$

$n_{ID}$ may be associated with at least one of a cell/virtual cell ID, different terminal IDs or UE group IDs, and an ID configured by the network device.

The above equations (2) and (3) are used to represent generator polynomials for generating the two m sequences. The generated Gold sequence may be $d(n)=1-2c(n)$.

Presumed that the quantity of symbols of the sequence of the WUS is S, $S=X*N*B*Sf$, and symbols mapped onto a time-frequency resource are acquired through Quadrature Phase Shift Keying (QPSK) modulation on the generated Gold sequence, a length of the Gold sequence c may be $M=2*S$.

Symbols r(s) for the physical signal for time-and-frequency synchronization mapped onto the time-frequency resource may be $$r(s) = \frac{1}{\sqrt{2}}(1 - 2 \cdot c(2s)) + j\frac{1}{\sqrt{2}}(1 - 2 \cdot c(2s+1)), s = 0, 1, \ldots, S-1.$$

Fifth Embodiment

In this embodiment, the WUS may be a narrowband signal sequence mapped continuously. For example, the WUS may be acquired through mapping, in a frequency domain and then in a time domain, a ZC sequence, an m sequence, a gold sequence, and a CGS having lengths of 31/63/127/255, or repeated sequences of these sequences, onto consecutive OFDM symbols and consecutive subcarriers.

The physical signal for time-and-frequency synchronization may be a Gold sequence mapped discretely and generated as mentioned in the third and fourth embodiments.

As resources mapped continuously, the WUS has an advantage of small overhead, so it is able to facilitate the detection of the WUS at relatively low complexity.

The WUS for time-and-frequency synchronization may be a sequence mapped discretely, so it is able to facilitate the fine time-and-frequency synchronization and the RRM measurement.

Sixth Embodiment

In this embodiment, the time-frequency resource position occupied by the physical signal for time-and-frequency synchronization within the occupied slot (i.e., a number of each occupied OFDM symbol and a subcarrier offset) may be associated with at least one of the cell ID, the terminal ID and the group ID of the UE group to which the terminal belongs.

For example, a start position of an OFDM symbol of the physical signal for time-and-frequency synchronization within the slot may be calculated in accordance with the terminal/UE group ID and/or the cell ID, e.g., the start position of the OFDM symbol may be mod(UE ID, 3)+2.

A start position of a subcarrier of the physical signal for time-and-frequency synchronization within the slot may be calculated in accordance with the cell ID and/or the terminal/UE group ID, e.g., a number of an initial subcarrier may be mod(cell ID, 4).

In this embodiment, the positions of the initial subcarriers on the OFDM symbols may be the same or different from each other.

Seventh Embodiment

In this embodiment, at reception start time in the DRX state or reception start time in the idle state, the terminal may receive the physical signal for time-and-frequency synchronization in advance on a predefined or configured time-frequency resource, or on a time-frequency resource associated with the terminal/UE group ID.

The receiving the downlink signal may include: performing channel estimation in accordance with the physical signal and estimating a power delay profile and a frequency offset in accordance with the channel estimation; adjusting reception start time for next reception for the terminal in the idle state or the DRX state in accordance with the estimated power delay profile, and performing frequency offset compensation on a next received signal in accordance with the estimated frequency offset; and detecting a PDCCH and/or a PDSCH in accordance with the signal on which the frequency offset compensation has been performed.

The above-mentioned time-and-frequency synchronization method time-and-frequency synchronization method may be applied to an OFDM radio communication system, an Internet of Thing (IoT) communication system, a narrowband communication system or a vehicle-mounted communication system in an LTE, 5G or any other newly-defined system.

Figure 8:
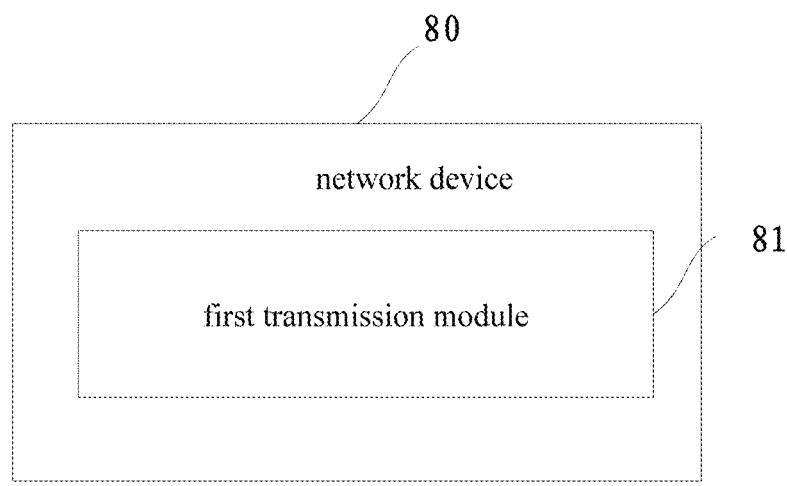
FIG. 8 is a schematic view showing the network device according to some embodiments of the present disclosure.

Based on a same inventive concept, as shown in FIG. 8, the present disclosure further provides in some embodiments a network device 80 which includes a first transmission module 81 configured to, subsequent to determining that a terminal in an idle state or a DRX state needs to be woken up to receive a downlink signal and prior to transmitting the downlink signal to the terminal, transmit a physical signal for time-and-frequency synchronization to the terminal.

According to the embodiments of the present disclosure, subsequent to determining that the terminal in the idle state or the DRX state needs to be woken up to receive the downlink signal and prior to transmitting the downlink signal to the terminal, the physical signal for the time-and-frequency synchronization may be transmitted to the terminal, so that the terminal may perform the time-and-frequency synchronization in accordance with the physical signal before the reception of the downlink signal. As a result, it is able to improve the reception performance of the terminal in the idle state or the DRX state while reducing the power consumption for signaling processing.

In a possible embodiment of the present disclosure, the first transmission module is configured to: when a WUS for waking up the terminal to receive the downlink signal is transmitted to the terminal in the idle state or the DRX state, determine that the terminal in the idle state or the DRX state needs to be woken up to receive the downlink signal; or when a GTS signal for indicating the terminal to be maintained in a sleep state is not transmitted to the terminal in the idle state or the DRX state at predetermined time, determine that the terminal in the idle state or the DRX state needs to be woken up to receive the downlink signal.

In a possible embodiment of the present disclosure, the network device may further include a generation module configured to generate a sequence of the physical signal. The sequence of the physical signal may be one of a Gold sequence, an m sequence, a ZC sequence and a CGS.

In a possible embodiment of the present disclosure, the generation module is further configured to generate the sequence of the physical signal in accordance with at least one of a cell ID, a terminal ID and a group ID of a UE group to which the terminal belongs. The physical signal may be transmitted by the network device to all terminals belonging to a same UE group simultaneously during the transmission of the physical signal.

In a possible embodiment of the present disclosure, the generation module is further configured to determine the terminal ID in accordance with at least one of an IMSI and an IMEI of the terminal, and/or determine the group ID of the UE group to which the terminal belongs in accordance with an IMSI and an IMEI of the terminal belonging to the UE group.

In a possible embodiment of the present disclosure, the network device may further include a second transmission module configured to transmit an ID for determining the sequence of the physical signal to the terminal, so as to enable the terminal to determine the sequence of the physical signal in accordance with the ID configured by the network device. The ID for determining the sequence of the physical signal may be at least one of the cell ID, the terminal ID and the group ID of the UE group to which the terminal belongs, or any other ID.

In a possible embodiment of the present disclosure, the first transmission module is further configured to determine configuration information about the physical signal, and transmit the physical signal to the terminal in accordance with the configuration information.

In a possible embodiment of the present disclosure, the network device may further include a third transmission module configured to transmit the configuration information about the physical signal to the terminal.

In a possible embodiment of the present disclosure, the third transmission module is further configured to transmit the configuration information about the physical signal to the terminal through RRC signaling or the WUS.

In a possible embodiment of the present disclosure, the first transmission module is further configured to acquire predefined configuration information about the physical signal.

In a possible embodiment of the present disclosure, the configuration information may include a time-frequency resource position of the physical signal, and the time-frequency resource position may include at least one of a time-frequency resource position occupied by the physical signal within an occupied radio frame and a time-frequency resource occupied by the physical signal within an occupied slot.

In a possible embodiment of the present disclosure, the first transmission module is further configured to: determine the time-frequency resource position occupied by the physical signal within the occupied radio frame in accordance with transmission time of the WUS and a time offset T1, where $0 \le T1 \le T0$, and T0 represents a time interval between a start time position of the WUS and a start time position of a PO/DRX On Duration; or determine the time-frequency resource position occupied by the physical signal within the occupied radio frame in accordance with the start time position of the PO/DRX On Duration and a time offset T2, where $0 \le T2 \le T0$, and T0 represents a time interval between a start time position of the WUS and the start time position of the PO/DRX On Duration; or determine the time-frequency resource position occupied by the physical signal within the occupied radio frame in accordance with at least one of the cell ID, the terminal ID and the group ID of the UE group to which the terminal belongs.

In a possible embodiment of the present disclosure, the network device may further include: a reception module configured to receive a processing capability level for DRX or paging reception reported by the terminal; and a determination module configured to determine T1 or T2 in accordance with the processing capability level.

In a possible embodiment of the present disclosure, the first transmission module is further configured to determine the time-frequency resource position occupied by the physical signal within the occupied slot in accordance with at least one of the cell ID, the terminal ID and the group ID of the UE group to which the terminal belongs.

In a possible embodiment of the present disclosure, the time-frequency resource positions occupied by the physical signal within the occupied slot may be distributed discretely.

Figure 9:
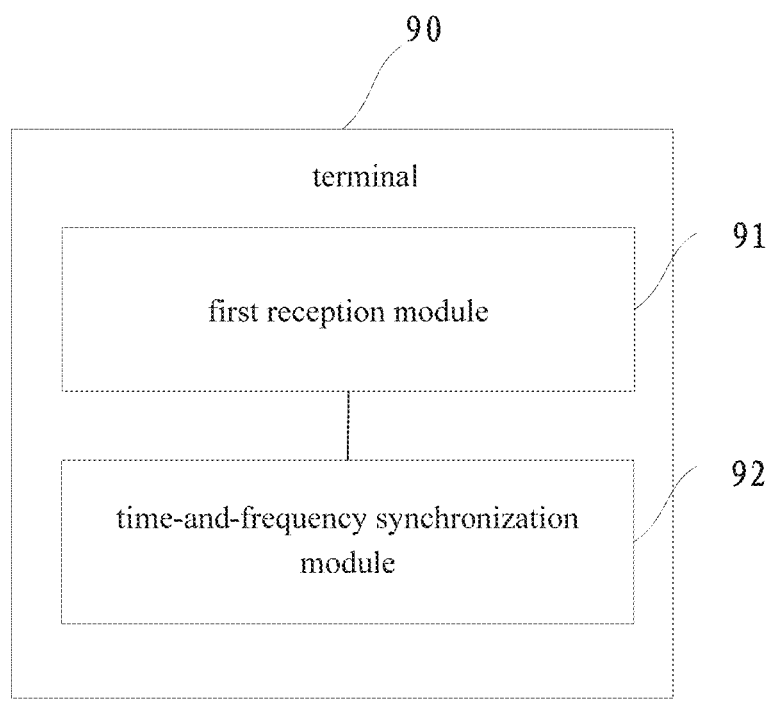
FIG. 9 is a schematic view showing the terminal according to some embodiments of the present disclosure.

As shown in FIG. 9, the present disclosure further provides in some embodiments a terminal 90 which includes: a first reception module 91 configured to, subsequent to determining that the terminal in an idle state or a DRX state needs to be woken up to receive a downlink signal, receive a physical signal for time-and-frequency synchronization from a network device; and a time-and-frequency synchronization module 92 configured to perform time-and-frequency synchronization in accordance with the physical signal.

According to the embodiments of the present disclosure, subsequent to determining that the terminal in the idle state or the DRX state needs to be woken up to receive the downlink signal, the terminal may receive the physical signal for time-and-frequency synchronization from the network device, so that the terminal may perform the time-and-frequency synchronization in accordance with the physical signal prior to receiving the downlink signal. As a result, it is able to improve the reception performance of the terminal in the idle state or the DRX state while reducing the power consumption for signaling processing.

In a possible embodiment of the present disclosure, the terminal may further include a second reception module configured to receive the downlink signal.

In a possible embodiment of the present disclosure, the first reception module is further configured to: when a WUS for waking up the terminal to receive the downlink signal has been received from the network device, determine that the terminal in the idle state or the DRX state needs to be woken up to receive the downlink signal; or when a GTS signal for indicating the terminal to be maintained in a sleep state has not been received at predetermined time, determine that the terminal in the idle state or the DRX state needs to be woken up to receive the downlink signal.

In a possible embodiment of the present disclosure, the terminal may further include a determination module configured to determine a sequence of the received physical signal.

In a possible embodiment of the present disclosure, the sequence of the physical signal may be one of a Gold sequence, an m sequence, a ZC sequence and a CGS.

In a possible embodiment of the present disclosure, the determination module is further configured to determine the sequence of the physical signal in accordance with at least one of a cell ID, a terminal ID and a group ID of a UE group to which the terminal belongs, or determine the sequence of the physical signal in accordance with an ID configured by the network device.

In a possible embodiment of the present disclosure, the determination module is further configured to determine the terminal ID in accordance with at least one of an IMSI and an IMEI of the terminal, and/or determine the group ID of the UE group to which the terminal belongs in accordance with at least one of an IMSI and an IMEI of each terminal belonging to the UE group.

In a possible embodiment of the present disclosure, the first reception module is further configured to acquire configuration information about the physical signal and receive the physical signal from the network device in accordance with the configuration information.

In a possible embodiment of the present disclosure, the first reception module is further configured to receive configuration information about the physical signal transmitted by the network device, or acquire predefined configuration information about the physical signal.

In a possible embodiment of the present disclosure, the first reception module is further configured to receive the configuration information about the physical signal transmitted by the network device through RRC signaling or the WUS.

In a possible embodiment of the present disclosure, the configuration information may include a time-frequency resource position of the physical signal, and the time-frequency resource position may include at least one of a time-frequency resource position occupied by the physical signal within an occupied radio frame and a time-frequency resource occupied by the physical signal within an occupied slot.

In a possible embodiment of the present disclosure, the first reception module is further configured to determine the time-frequency resource position occupied by the physical signal within the occupied radio frame in accordance with transmission time of the WUS and a time offset T1, where $0 \leq T1 \leq T0$, and T0 represents a time interval between a start time position of the WUS and a start time position of a PO/DRX On Duration; or determine the time-frequency resource position occupied by the physical signal within the occupied radio frame in accordance with the start time position of the PO/DRX On Duration and a time offset T2, where $0 \leq T2 \leq T0$, and T0 represents a time interval between a start time position of the WUS and the start time position of the PO/DRX On Duration; or determine the time-frequency resource position occupied by the physical signal within the occupied radio frame in accordance with at least one of the cell ID, the terminal ID and the group ID of the UE group to which the terminal belongs. T1 or T2 may be predefined, or configured by the network device.

In a possible embodiment of the present disclosure, the terminal may further include: a reporting module configured to report a processing capability level for DRX or paging reception to the network device; and a third reception module configured to receive T1 or T2 configured by the network device in accordance with the processing capability level.

In a possible embodiment of the present disclosure, the first reception module is further configured to determine the time-frequency resource position occupied by the physical signal within the occupied slot in accordance with at least one of the cell ID, the terminal ID and the group ID of the UE group to which the terminal belongs.

In a possible embodiment of the present disclosure, the terminal may further include an RRM measurement module configured to perform RRM measurement in accordance with the physical signal.

In a possible embodiment of the present disclosure, the first reception module is configured to receive the WUS and the physical signal through a single receiver or different receivers.

In a possible embodiment of the present disclosure, the second reception module is further configured to: perform channel estimation in accordance with the physical signal and estimate a power delay profile and a frequency offset in accordance with the channel estimation; adjust reception start time for next reception for the terminal in the idle state or the DRX state in accordance with the estimated power delay profile, and perform frequency offset compensation on a next received signal in accordance with the estimated frequency offset; and detect a PDCCH and/or a PDSCH in accordance with the signal on which the frequency offset compensation has been performed.

The present disclosure further provides in some embodiments a network deice, which includes a processor, a memory, and a computer program stored in the memory and executed by the processor. The processor is configured to execute the computer program so as to implement the above-mentioned time-and-frequency synchronization method for the network device.

The present disclosure further provides in some embodiments a terminal, which includes a processor, a memory, and a computer program stored in the memory and executed by the processor. The processor is configured to execute the computer program so as to implement the above-mentioned time-and-frequency synchronization method for the terminal.

The present disclosure further provides in some embodiments a computer-readable storage medium storing therein a computer program. The computer program is executed by a processor so as to implement the above-mentioned time-and-frequency synchronization method for the network device. The computer-readable storage medium may be a Read-Only Memory (ROM), a Random Access Memory (RAM), a magnetic disk or an optical disk.

The present disclosure further provides in some embodiments a computer-readable storage medium storing therein a computer program. The computer program is executed by a processor so as to implement the above-mentioned time-and-frequency synchronization method for the terminal. The computer-readable storage medium may be an ROM, an RAM, a magnetic disk or an optical disk.

Figure 10:
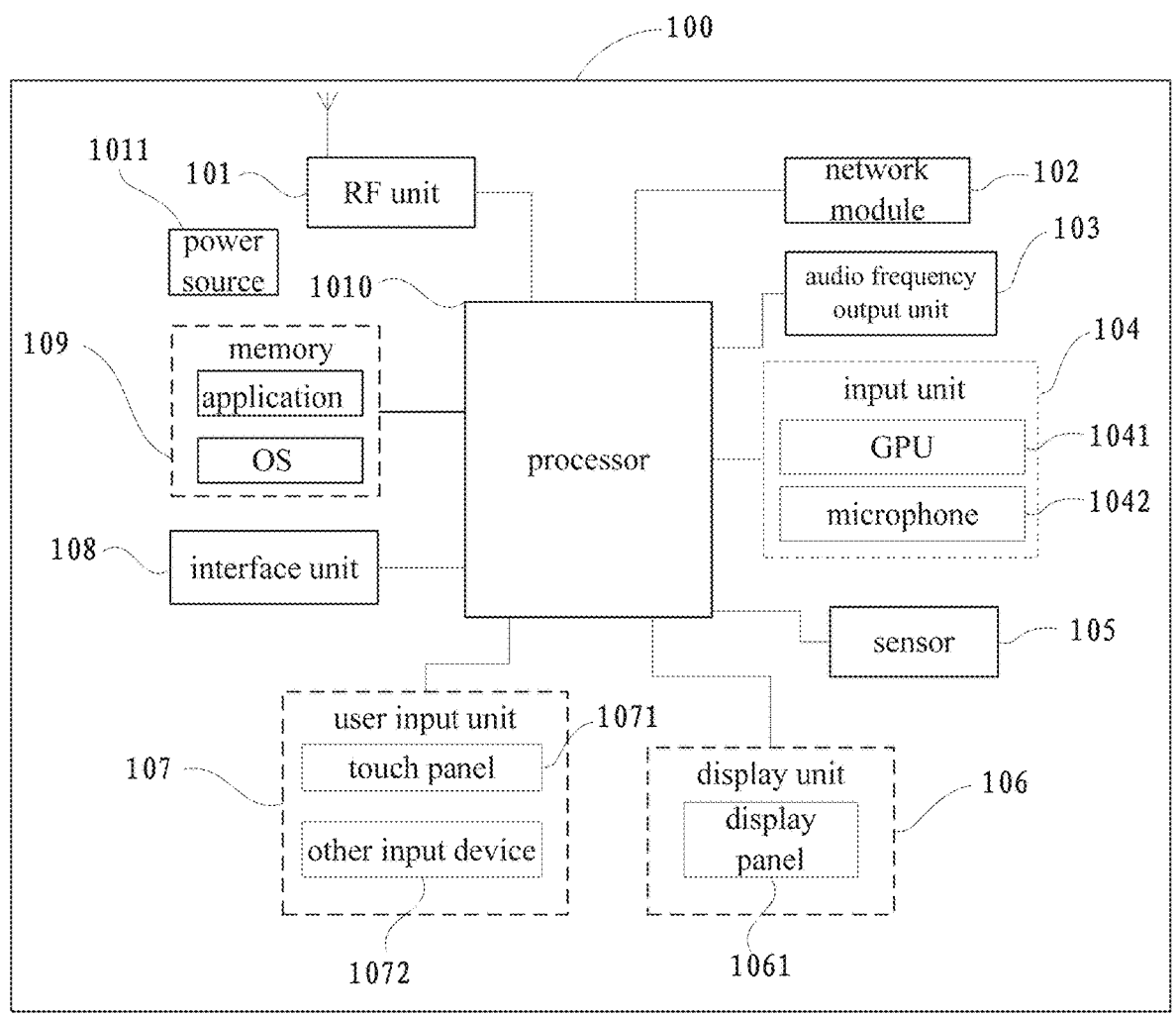
FIG. 10 is a schematic view showing a hardware structure of a mobile terminal according to some embodiments of the present disclosure.

FIG. 10 is a schematic view showing a hardware structure of a mobile terminal according to some embodiments of the present disclosure. As shown in FIG. 10, the mobile terminal 100 may include, but not limited to, a Radio Frequency (RF) unit 101, a network module 102, an audio output unit 103, an input unit 104, a sensor 105, a display unit 106, a user input unit 107, an interface unit 108, a memory 109, a processor 1010, and a power source 1011. It should be appreciated that, the structure in FIG. 10 shall not be construed as limiting the mobile terminal. The mobile terminal may include more or fewer members, or some members may be combined, or the mobile terminal may include some other members not shown in FIG. 10. In the embodiments of the present disclosure, the mobile terminal may include, but not limited to, mobile phone, flat-panel computer, laptop computer, Personal Digital Assistant (PDA), vehicle-mounted terminal, wearable device or pedometer.

The RF unit 101 is configured to, subsequent to determining that the terminal in an idle state or a DRX state needs to be woken up to receive a downlink signal, receive a physical signal for time-and-frequency synchronization from a network device, and the processor 1010 is configured to perform time-and-frequency synchronization in accordance with the physical signal.

According to the embodiments of the present disclosure, subsequent to determining that the terminal in the idle state or the DRX state needs to be woken up to receive the downlink signal, the terminal may receive the physical signal for time-and-frequency synchronization from the network device, so that the terminal may perform the time-and-frequency synchronization in accordance with the physical signal prior to receiving the downlink signal. As a result, it is able to improve the reception performance of the terminal in the idle state or the DRX state while reducing the power consumption for signaling processing.

It should be appreciated that, in the embodiments of the present disclosure, the RF unit 101 is configured to transmit and receive signals during the information transmission or phone call. To be specific, the RF unit 101 may, upon the receipt of downlink data from the network device, transmit the downlink data to the processor 1010 for subsequent treatment. In addition, the RF unit 101 may transmit uplink data to the network device. Usually, the RF unit 101 may include, but not limited to, an antenna, at least one amplifier, a transceiver, a coupler, a low-noise amplifier and a duplexer. In addition, the RF unit 101 may communicate with a network and the other devices via a wireless communication system.

The network module 102 is configured to enable the mobile terminal to access the broadband Internet in a wireless manner, e.g., help a user to receive and send an e-mail, browse a web page or access a streaming media.

The audio output unit 103 is configured to convert audio data received by the RF unit 161 or the network module 102, or audio data stored in the memory 109, into an audio signal and output the audio signal as a sound. In addition, the audio output unit 103 is further configured to provide an audio output related to a specific function executed by the mobile terminal 100 (e.g., a sound occurring when a calling signal or a message has been received). The audio output unit 103 may include a loudspeaker, a buzzer and a receiver.

The input unit 104 is configured to receive an audio or video signal. It may include a Graphics Processing Unit (GPU) 1041 and a microphone 1042. The GPU 1041 is configured to process image data of a static image or video acquired by an image collection unit (e.g., a camera) in a video capturing mode or an image capturing mode, and a processed image frame may be displayed by the display unit 106. The image frame processed by the GPU 1041 may be stored in the memory 109 (or any other storage medium) or transmitted via the RF unit 101 or network module 102. The microphone 1042 is configured to receive a sound, and convert the sound into voice data. In a call mode, the processed audio data may be converted into data in a format capable of being transmitted by the RF unit 101 to a mobile communication base station.

The at least one sensor 105 may include a light sensor, a movement sensor and the other sensors. To be specific, the light sensor may include an ambient light sensor or a proximity sensor. The ambient light sensor is configured to adjust a brightness value of a display panel 1061 in accordance with ambient light. The proximity sensor is configured to turn off the display panel 1061 and/or a backlight source when the mobile terminal 100 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the mobile terminal (e.g., perform a switching operation between portrait and landscape orientations, play relevant games, and calibrate a posture of a magnetometer), and perform vibration-related functions (e.g., count steps and strikes). The sensor 105 may further include a fingerprint sensor, a pressure sensor, an iris sensor, a molecule sensor, a gyroscope, a barometer, a hygrometer, a thermometer or an infrared sensor, which will not be particularly defined herein.

The display unit 106 is configured to display information inputted by the user or provided to the user. The display unit 106 may include the display panel 1061, e.g., a Liquid Crystal Display (LCD) panel, or an Organic Light-Emitting Diode (OLED) panel.

The user input unit 107 is configured to receive digital or character information inputted by the user, and generate a key signal input related to user settings and function control of the UE. To be specific, the user input unit 107 may include a touch panel 1071 and an input device 1072. The touch panel 1071, also called as touch screen, is configured to collect a touch operation made by the user on or in proximity to the touch panel (e.g., an operation made by the user through any appropriate object or attachment (e.g., finger or stylus) on or in the proximity to the touch panel 1071). The touch panel 1071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1010, and receive and execute a command from the processor 1010. In addition, the touch panel 1071 may be of a resistive type, a capacitive type, an infrared type or a surface acoustic wave (SAW) type. The other input device 1072 may include, but not limited to, a physical keyboard, a functional button (e.g., a volume control button or an on/off button), a trackball, a mouse, and a joystick, which will not be particularly defined herein.

Further, the touch panel 1071 may cover the display panel 1061. When the touch operation made on or in proximity to the touch panel 1071 has been detected, the touch panel 1071 may transmit the touch information to the processor 1010, so as to determine a type of a touch event. Then, the processor 1010 may control the display panel 1061 to provide a corresponding visual output in accordance with the type of the touch event. Although the touch panel 1071 and the display panel 1061 are configured as two separate members in FIG. 10, in some embodiments of the present disclosure, they may be integrated so as to achieve the input and output functions of the electronic device, which will not be particularly defined herein.

The interface unit 108 is configured to provide an interface between an external device and the mobile terminal 100. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 108 is configured to receive an input from the external device (e.g., data information and electricity) and transmit the input to one or more elements of the mobile terminal 100, or transmit data between the mobile terminal 100 and the external device.

The memory 109 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 109 may include a high-speed RAM, or a non-volatile memory (e.g., at least one magnetic disk or flash memory), or any other volatile solid state memory.

As a control center of the electronic device, the processor 1010 may be connected to the other members of the electronic device via various interfaces and circuits, and configured to run or execute the software program and/or module stored in the memory 109, and call the data stored in the memory 109, so as to execute the functions of the electronic device and process the data, thereby to monitor the entire electronic device. The processor 1010 may include one or more processing units. In a possible embodiment of the present disclosure, an application processor and a modem may be integrated into the processor 1010. The application processor is mainly configured to process the operating system, a user interface and the application. The modem is mainly configured to process wireless communication. It should be appreciated that, the modem may also not be integrated into the processor 1010.

The power source 1011 (e.g., a battery) is configured to supply power to the members of the mobile terminal 100. In a possible embodiment of the present disclosure, the power source 1011 is logically connected to the processor 1010 via a power source management system, so as to achieve such functions as charging, discharging and power consumption management through the power source management system.

In addition, the mobile terminal 100 may include some functional modules not shown in FIG. 10, which will not be particularly defined herein.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A time-and-frequency synchronization method performed by a terminal, the time-and-frequency synchronization method comprising:

receiving from a network device a Wake-Up Signal (WUS) for waking up the terminal to receive a downlink signal carrying physical data and control information, which determines whether the terminal in an idle state or a Discontinuous Reception (DRX) state needs to be woken up to receive the downlink signal carrying physical data and control information;

receiving a physical signal for time-and-frequency synchronization from the network device, in response to determining that the terminal in the idle state or the DRX state needs to be woken up to receive the downlink signal carrying physical data and control information;

performing time-and-frequency synchronization in accordance with the physical signal for time-and-frequency synchronization; and receiving from the network device the downlink signal carrying physical data and control information, wherein the receiving the physical signal for time-and-frequency synchronization from the network device comprises:

receiving configuration information about the physical signal for time-and-frequency synchronization transmitted by the network device through the WUS; and receiving the physical signal from the network device in accordance with the configuration information.

2. The time-and-frequency synchronization method according to claim 1, wherein the determining that the terminal in the idle state or the DRX state needs to be woken up to receive the downlink signal further comprises:

in the case that a Go-To-Sleep (GTS) signal for indicating the terminal to be maintained in a sleep state has not been received at a predetermined time, determining that the terminal in the idle state or the DRX state needs to be woken up to receive the downlink signal.

3. The time-and-frequency synchronization method according to claim 1, wherein prior to preforming the time-and-frequency synchronization in accordance with the physical signal, the time-and-frequency synchronization method further comprises:

determining a sequence of the received physical signal.

4. The time-and-frequency synchronization method according to claim 3, wherein the sequence of the physical signal is one of a Gold sequence, an m sequence, Zadoff-chu (ZC) sequence and a Computer Generated Sequence (CGS).

5. The time-and-frequency synchronization method according to claim 3, wherein the determining the sequence of the physical signal comprises:

determining the sequence of the physical signal in accordance with at least one of a cell Identity (ID), a terminal ID, or a group ID of a User Equipment (UE) group to which the terminal belongs; or determining the sequence of the physical signal in accordance with an ID configured by the network device.

6. The time-and-frequency synchronization method according to claim 5, wherein the terminal ID is determined in accordance with at least one of an International Mobile Subscriber Identity (IMSI) or an International Mobile Equipment Identity (IMEI) of the terminal, and/or the group ID of the UE group to which the terminal belongs is determined in accordance with at least one of an IMSI or an IMEI of each terminal belonging to the UE group.

7. The time-and-frequency synchronization method according to claim 1, wherein the acquiring the configuration information about the physical signal further comprises:

acquiring predefined configuration information about the physical signal.

8. The time-and-frequency synchronization method according to claim 1, wherein the receiving the configuration information about the physical signal transmitted by the network device further comprises:

receiving the configuration information about the physical signal transmitted by the network device through RRC signaling.

9. The time-and-frequency synchronization method according to claim 1, wherein the configuration information comprises a time-frequency resource position of the physical signal, and the time-frequency resource position comprises at least one of a time-frequency resource position occupied by the physical signal within an occupied radio frame and or a time-frequency resource occupied by the physical signal within an occupied slot.

10. The time-and-frequency synchronization method according to claim 9, wherein the acquiring the configuration information about the physical signal comprises:

determining the time-frequency resource position occupied by the physical signal within the occupied radio frame in accordance with transmission time of the WUS and a time offset T1, where $0 \leq T1 \leq T0$, and T0 represents a time interval between a start time position of the WUS and a start time position of a Paging Opportunity (PO)/DRX On Duration; or determining the time-frequency resource position occupied by the physical signal within the occupied radio frame in accordance with the start time position of the PO/DRX On Duration and a time offset T2, where $0 \leq T2 \leq T0$, and T0 represents a time interval between a start time position of the WUS and the start time position of the PO/DRX On Duration; or determining the time-frequency resource position occupied by the physical signal within the occupied radio frame in accordance with at least one of the cell ID, the terminal ID, or the group ID of the UE group to which the terminal belongs.

11. The time-and-frequency synchronization method according to claim 10, wherein T1 or T2 is predefined, or configured by the network device.

12. The time-and-frequency synchronization method according to claim 11, further comprising:

reporting a processing capability level for DRX or paging reception to the network device; and receiving T1 or T2, which are configured by the network device in accordance with the processing capability level.

13. The time-and-frequency synchronization method according to claim 9, wherein the acquiring the configuration information about the physical signal comprises:

determining the time-frequency resource position occupied by the physical signal within the occupied slot in accordance with at least one of the cell ID, the terminal ID, or the group ID of the UE group to which the terminal belongs.

14. The time-and-frequency synchronization method according to claim 1, wherein subsequent to receiving the physical signal from the network device, the time-and-frequency synchronization method further comprises:

performing Radio Resource Management (RRM) measurement in accordance with the physical signal.

15. A time-and-frequency synchronization method performed by a network device, the time-and-frequency synchronization method comprising:

transmitting to a terminal a Wake-Up Signal (WUS) for waking up the terminal device to receive a downlink signal carrying physical data and control information, which determines whether the terminal device in an idle state or a Discontinuous Reception (DRX) state needs to be woken up to receive the downlink signal carrying physical data and control information;

transmitting a physical signal for time-and-frequency synchronization to the terminal, in response to determining that the terminal in the idle state or the DRX state needs to be woken up to receive the downlink signal carrying physical data and control information;

performing time-and-frequency synchronization in accordance with the physical signal for time-and-frequency synchronization; and transmitting to the terminal the downlink signal carrying physical data and control information, wherein the transmitting the physical signal for time-and-frequency synchronization to the terminal comprises:

determining configuration information about the physical signal for time-and-frequency synchronization, and transmitting the physical signal for time-and-frequency synchronization to the terminal in accordance with the configuration information; and transmitting the configuration information about the physical signal for time-and-frequency synchronization to the terminal through WUS.

16. The time-and-frequency synchronization method according to claim 15, wherein the determining that the terminal in the idle state or the DRX state needs to be woken up to receive the downlink signal further comprises:

in the case that a Go-To-Sleep (GTS) signal for indicating the terminal to be maintained in a sleep state is not transmitted to the terminal in the idle state or the DRX state at predetermined time, determining that the terminal in the idle state or the DRX state needs to be woken up to receive the downlink signal.

17. The time-and-frequency synchronization method according to claim 16, wherein prior to transmitting the physical signal for time-and-frequency synchronization to the terminal, the time-and-frequency synchronization method further comprises:

generating a sequence of the physical signal.

18. A network device, comprising a processor, a memory, and a program stored in the memory and executed by the processor, wherein the processor is configured to execute the program so as to implement the time-and-frequency synchronization method according to claim 15.

19. A terminal device, comprising a processor, a memory, and a program stored in the memory and executed by the processor, wherein the processor is configured to execute the program so as to implement a time-and-frequency synchronization method for the terminal device, the time-and-frequency synchronization method comprising:

receiving from a network device a Wake-Up Signal (WUS) for waking up the terminal to receive a downlink signal carrying physical data and control information, which determines whether the terminal in an idle state or a Discontinuous Reception (DRX) state needs to be woken up to receive the downlink signal carrying physical data and control information;

receiving a physical signal for time-and-frequency synchronization from the network device, in response to determining that the terminal in the idle state or the DRX state needs to be woken up to receive the downlink signal carrying physical data and control information;

performing time-and-frequency synchronization in accordance with the physical signal for time-and-frequency synchronization; and receiving from the network device the downlink signal carrying physical data and control information, wherein the receiving the physical signal for time-and-frequency synchronization from the network device comprises:

receiving configuration information about the physical signal for time-and-frequency synchronization transmitted by the network device through the WUS; and receiving the physical signal from the network device in accordance with the configuration information.

20. The terminal device according to claim 19, wherein the determining that the terminal in the idle state or the DRX state needs to be woken up to receive the downlink signal further comprises:

in the case that a Go-To-Sleep (GTS) signal for indicating the terminal to be maintained in a sleep state has not been received at a predetermined time, determining that the terminal in the idle state or the DRX state needs to be woken up to receive the downlink signal.

* * * * *